United States Patent
Kruse

(10) Patent No.: US 11,251,730 B2
(45) Date of Patent: Feb. 15, 2022

(54) METHOD FOR CONTROLLING A WIND TURBINE

(71) Applicant: Wobben Properties GmbH, Aurich (DE)

(72) Inventor: Marcel Kruse, Beverstedt (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/462,880

(22) PCT Filed: Nov. 23, 2017

(86) PCT No.: PCT/EP2017/080182
§ 371 (c)(1),
(2) Date: May 21, 2019

(87) PCT Pub. No.: WO2018/096028
PCT Pub. Date: May 31, 2018

(65) Prior Publication Data
US 2020/0083829 A1    Mar. 12, 2020

(30) Foreign Application Priority Data
Nov. 23, 2016 (DE) ..................... 10 2016 122 581.9

(51) Int. Cl.
*H02P 9/10* (2006.01)
*F03D 9/25* (2016.01)
(Continued)

(52) U.S. Cl.
CPC .............. *H02P 9/105* (2013.01); *F03D 9/257* (2017.02); *H02P 9/006* (2013.01); *H02P 2101/15* (2015.01)

(58) Field of Classification Search
CPC ...... H02P 9/105; H02P 9/006; H02P 2101/15; F03D 9/257
See application file for complete search history.

(56) References Cited

U.S. PATENT DOCUMENTS

| 9,920,746 B2 | 3/2018 | Diedrichs et al. |
| 2010/0138058 A1* | 6/2010 | Kirchner ............... F03D 7/0284 700/286 |

(Continued)

FOREIGN PATENT DOCUMENTS

| EP | 2902621 A1 | 8/2015 |
| EP | 2015527857 A | 9/2015 |

(Continued)

OTHER PUBLICATIONS

Diedrichs et al., "Loss of (Angle) Stability of Wind Power Plants—The Underestimated Phenomenon in Case of Very Low Short Circuit Radio-" oral presentation at the 10$^{th}$ International Workshop on Large-Scale Integration of Wind Power into Power Systems, Aarhus (Denmark), Oct. 25-26, 2011, 8 pages.

*Primary Examiner* — Viet P Nguyen
(74) *Attorney, Agent, or Firm* — Seed IP Law Group LLP

(57) ABSTRACT

A method for controlling a generator of electrical energy connected to a grid connection point of an electrical supply grid, comprising the steps of: regularly feeding electrical reactive power and electrical active power into the electrical supply grid, the generator being operated at a first working point, at which the electrical generator generates electrical reactive power and electrical active power, first interrupting or changing the feeding of the electrical reactive power and/or the electrical active power into the electrical supply grid when there is, or it is indicated that there is, a disruption in the electrical supply grid or a disruption of the feed into the electrical supply grid, resuming the regular feeding of the electrical reactive power and/or electrical active power into the electrical supply grid, the generator performing the resumption at a second working point or being ramped up to the second working point, at which the electrical generator generates and feeds in electrical reactive power and/or electrical active power, and suppressing the resumption of (Continued)

the feeding of the electrical reactive power and/or the electrical active power into the electrical supply grid in such a way that the electrical generator ceases feeding the electrical reactive power and/or the electrical active power for a shut-off period if an interruption has recurred within a predetermined counting time interval, or suppressing the feeding of the electrical reactive power and/or the electrical active power into the electrical supply grid in such a way that the electrical generator ceases feeding the electrical reactive power and/or the electrical active power for a shut-off period if a change of the feed has recurred within a predetermined counting time interval.

17 Claims, 4 Drawing Sheets

(51) Int. Cl.
*H02P 9/00* (2006.01)
*H02P 101/15* (2016.01)

(56) References Cited

U.S. PATENT DOCUMENTS

| | | | |
|---|---|---|---|
| 2011/0057444 A1* | 3/2011 | Dai | H02J 3/386 |
| | | | 290/44 |
| 2012/0280569 A1* | 11/2012 | Alam | H02J 3/32 |
| | | | 307/60 |
| 2015/0137520 A1* | 5/2015 | Garcia | H02J 3/1885 |
| | | | 290/44 |
| 2015/0198145 A1* | 7/2015 | Diedrichs | F03D 7/048 |
| | | | 700/287 |
| 2015/0267686 A1* | 9/2015 | Kjae.butted.r | F03D 7/0224 |
| | | | 290/44 |
| 2017/0328342 A1* | 11/2017 | KJ R | F03D 7/028 |
| 2020/0003181 A1* | 1/2020 | Brombach | F03D 7/0264 |

FOREIGN PATENT DOCUMENTS

| | | |
|---|---|---|
| EP | 3076012 A1 | 10/2016 |
| JP | 2016191327 A | 11/2016 |
| RU | 2262790 C1 | 10/2005 |
| WO | 2014/009223 A2 | 1/2014 |

* cited by examiner

METHOD FOR CONTROLLING A WIND TURBINE

BACKGROUND

Technical Field

The present invention relates to a method for controlling a generator of electrical energy connected to a grid connection point of an electrical supply grid. The present invention also relates to a generator of electrical energy connected to an electrical supply grid, in particular a wind power installation.

Description of the Related Art

The feeding of electrical energy into an electrical supply grid, such as for example the European synchronous grid, is generally known. Quite generally, these electrical supply grids usually have a safe grid state—they are therefore stable, in particular with regard to their grid frequency and their grid voltage.

Various grid faults, such as for example a short-circuit, can cause the electrical supply grids to go into a vulnerable grid state, in which for example it is no longer possible for all of the consumers of the supply grid to be supplied with electrical energy. The grid then has a disruption.

An example of such a disruption is known as a loss of stability. This is described for example in the article "Loss of (Angle) Stability of Wind Power Plants" by V. Diedrichs et al. The article was submitted for and presented at the "10th International Workshop on Large-Scale Integration of Wind Power into Power Systems as well as on Transmission Networks for Offshore Wind Farms, Aarhus (Denmark), Oct. 25-26, 2011".

Depending on the type of disruption, that is to say for example when there is a loss of stability, as a reaction to the disruption the generators interrupt or change their power feed until the disruption has passed or been rectified. Directly after the disruption has been rectified, the generators then ramp up the power feed again or feed regularly into the electrical supply grid again, in the same way as before the disruption. An example of ramping up is disclosed in WO 2014/009223 A2.

Usually, it is in this case assumed that during the interruption, the boundary conditions of the electrical supply grid have changed, so that a single interruption or change is sufficient to counteract the disruption successfully. For example, the grid fault was rectified during the interruption and the supply grid is once again in a safe grid state, so that the generator or generators can continue to operate normally. A change of the feed relates particularly to a change to grid-supporting operation.

If, however, during the interruption, the boundary conditions of the electrical supply grid have not changed or not changed positively or only apparently, the disruption may occur again and the generator once again changes its power feed in the same way. This can cause an oscillation of the supply grid or the generator, i.e., the generator and the supply grid fluctuate with respect one another in a quasi-stable state. This can likewise make other generators or consumers fluctuate, with for example the impending risk of a critical grid state, in which failure of the supply grid may occur.

The German Patent and Trademark Office has searched the following prior art in the priority application relating to the present application: EP 2 902 621 A1.

BRIEF SUMMARY

Provided is a method that provides improved control of a generator of electrical energy in a vulnerable grid state, in particular in order to counteract a potential grid failure. A method for controlling a generator of electrical energy connected to a grid connection point of an electrical supply grid is proposed. Accordingly, electrical power is regularly fed into the electrical supply grid at a first working point. Such a working point may be determined for example by the active power fed in and possibly the reactive power fed in. Regular feeding is such feeding that is not changed or affected by a disruption in the electrical supply grid or a disruption of the feed into the electrical supply grid. Regular feeding is consequently feeding without any disruption.

While the generator is being operated regularly at this first working point, a first interruption or change of the feed, in particular of the active power, so that no power or a changed power is fed into the electrical supply grid, occurs when there is, or it is indicated that there is, a disruption in the electrical supply grid or a disruption of the feed into the electrical supply grid. A disruption should be understood here as meaning in particular disruptions that are relevant to the grid, such as for example an excessive voltage drop at the grid connection point. Preferably, the generator responds to the interruption or the change of the feed by being brought down into a self-sustaining mode or into some other operating mode, in particular an operating mode that takes the disruption into consideration, preferably one that counters disruptions. In the case of the self-sustaining mode, the generator generates enough energy to cover its requirements, for example for emergency lighting, pitch drive and/or other devices relevant to safety. The self-sustaining mode is also referred to as the self-sufficient mode. In the case of the other operating mode, the generator is controlled in such a way that it counters the disruption, that is to say counteracts the disruption, for example by increased reactive power feeding.

In the next step, the regular feeding or the feeding in is resumed at a second working point, so that the electrical power is again fed regularly into the electrical supply grid. The resumption in this case preferably takes place by means of a ramp, that is to say with a constant positive time-based change of the power. The time from the interruption to the resumption is referred to as the interruption time.

The first and second working points may in principle also be the same here. However, it is preferably proposed that they are different, in particular that the second working point has a low feed-in power.

If once again there is, or it is indicated that there is, the same disruption, the feeding is once again interrupted or changed.

If the interruption then recurs within a predetermined counting time interval, it is proposed to suppress the resumption of the feeding for a shut-down period. The shut-down period is in this case greater by a multiple than the interruption time. For example, the interruption time is several seconds and the shut-down period is several minutes. The shut-down period is then for example greater than the interruption time by a factor of 10.

Changing the feeding means in particular performing grid support; this may take place, for example in the case of a short-circuit in the supply grid, also by increasing the feed;

the generator then therefore responds to the short-circuit by deliberately feeding with increased power, in particular in order that the grid protection of the supply grid also detects and trips the short-circuit as such.

Preferably, changing the feeding comprises a changeover in the operating mode of the generator, in particular to an operating mode of the generator that is chosen in dependence on the disruption, preferably automatically, in order to counter the disruption, in particular in order to rectify the disruption.

If the changing recurs within a predetermined counting time interval, it is proposed to suppress the feed for a shut-down period. Therefore, the feeding is suppressed, to be specific in such a way that the electrical generator ceases feeding the electrical reactive power and/or the electrical active power for a shut-down period if a change of the feed has recurred within a predetermined counting time interval.

In principle, the reasons, explanations and embodiments for suppressing the resumption of feeding can be applied in the same way as they are to suppressing the feeding. The two cases are simply referred to together as suppressing. The reasons, explanations and embodiments that concern interrupting the feeding can therefore also be transferred analogously to changing the feeding. This also applies particularly to the embodiments that are described by way of example in connection with the accompanying figures.

In a preferred embodiment, the suppressing of the resumption or of the feeding continues until the grid operator gives the generator clearance again by means of an external signal. The generator then remains interrupted, preferably in the self-sustaining mode, until it receives clearance from the grid operator to feed regularly again.

Preferably, the suppressing also only occurs after recurrent interrupting or changing of the feed. Therefore, the second working point is recurrently adopted or it is recurrently attempted to adopt the second working point stably. Whether or not the second working point is stably adopted can be determined for example by means of a time band. If the generator is brought to the second working point or reaches it, the time band begins to run. If a renewed disruption occurs during the duration of the time band, the second working point is stably reached.

In a particularly preferred embodiment, the generator of electrical energy is a wind power installation.

The preferred method is in this case particularly well suited for decentralized generators, because they are formed from units of low power, which individually have only a small influence on the supply grid. Suppressing the feeding consequently has only a small but well-controllable influence on the power equilibrium of the supply grid. The control can also be performed relatively flexibly and independently of other generators, without unnecessarily putting the grid state at risk. For supply grids that are dominated by decentralized generators, it is also appropriate to use a cascaded method sequence between the individual decentralized generators. Furthermore, the proposed method can also be used through the course of a "system split", that is to say when the supply grid breaks down into a number of sub-grids due to a major disruption.

Preferably, recurrent interrupting or recurrent changing is assessed in dependence on the counting time interval and there is recurrent interrupting or recurrent changing if the interrupting or changing of the feed has occurred within the counting time interval more often than a predetermined limiting number.

Consequently there is only recurrent interrupting or recurrent changing if feeding has been interrupted or changed often enough within the counting time interval. The decisive criterion for suppressing the feeding is therefore the number of interruptions or changes per time interval. The predetermined counting time interval and the predetermined limit value are in this case preferably to be determined while taking into consideration the grid connection point.

Preferably, when there is a weak grid connection point, the feeding should be suppressed more readily, and then much earlier, than when there is a strong grid connection point, in order to prevent an oscillation of the supply grid.

Preferably, less electrical reactive power and/or less electrical active power is generated and fed in at the second working point than at the first working point.

The second working point consequently has a higher power reserve than the first working point. This is particularly advantageous for keeping further control power for the electrical supply grid after the disruption.

For example, the generator has a rated apparent power of 2.0 MVA and has fed in at the first working point an apparent power of 1.5 MVA. Consequently, 0.5 MVA has been kept at the working point as control power. At the second working point, that is to say after the interruption, the generator only feeds in an apparent power of 1.0 MVA, although on the basis of the wind much more would be possible. The generator then keeps 1.0 MVA control power at the second working point. Accordingly, the generator then makes twice the control power available at the second working point.

Preferably, the predetermined counting time interval starts with the first interruption or the first change of the feed of the electrical reactive power and/or the electrical active power and is reset with the suppression of the resumption or the suppression of the feeding of the electrical reactive power and/or the electrical active power or, if there is feeding without any interruption, ends after reaching the second working point.

The predetermined counting time interval consequently begins with the first interruption or the first change of the feed. During this time interval, the first and further interruptions or changes are counted. If this counted value then exceeds a predetermined limit value, for example, 3, 4 or 5, the resumption of the feeding or the feeding is suppressed.

A renewed interruption or renewed change during the counting time interval preferably does not reset the counting time interval. The counting time interval is preferably only reset whenever the feeding has been suppressed or the generator feeds in without any interruption.

In order to detect feeding without any interruption or without any change or stable reaching of the second working point, a further time band may be used, for example 5 minutes. If the generator therefore feeds into the electrical supply grid without any interruption or without any change for 5 minutes, feeding without any interruption or without any change is established and the counting time interval is reset.

Preferably, with each interruption or with each change, it is checked whether it is a recurrent interruption or a recurrent change in a counting time interval, in particular whether, with it, an interruption or a change has occurred in a counting time interval more often than the predetermined limit number. It is consequently particularly proposed that such a check is carried out in principle identically for each interruption or for each change and that different criteria are not checked for different interruptions or different changes. The point is that the counting time interval should be understood as a time window that has a fixed duration but can be at any desired point in time, that is to say can for example start at any desired point in time. Consequently, a sliding time window is taken as a basis for the check. There is a recurrent interruption or a recurrent change if an interruption or a change occurs for the second time or more frequent times in the counting time interval, that is to say in the sliding time window. In particular, it is checked whether an interruption or a change occurs more often in this sliding time window than the predetermined limit number. That is intended always to be the criterion for the sliding time window, irrespective of where this time window lies in the time domain or along a timeline.

If, for example, an interruption or a change occurs after a relatively long time period without any interruption or without any change, it should not be just that it is checked whether, beginning from this interruption or change, a recurrent interruption or a recurrent change occurs within this counting time interval, that is to say whether an interruption or a change occurs within this counting time interval more often than the predetermined limit number, but that this is checked continuously. There are particularly two conceivable possibilities for this, for example, but there may also be further variants.

According to one variant, with each occurring interruption or each occurring change a counting time interval is started and it is checked up to the end of this counting time interval whether a recurrent interruption or a recurrent change has occurred, in particular therefore whether an interruption or a change has occurred more often than the predetermined limit number. However, as soon as a second interruption or a second change occurs, a new counting time interval is started for this and said check is carried out. If, therefore, a predetermined limit number of five is set for example, with the first interruption or the first change the counting time interval is started and it is checked whether more than five interruptions or changes occur in this counting time interval. Overlapping with this, with the second interruption or the second change, a counting time interval is likewise started and it is checked whether in this counting time interval more than five interruptions or more than five changes occur. Thus, it may be for example that four interruptions or changes occur in the first counting time interval, the second interruption or change already occurring a long time after the first, for example in the middle of this counting time interval. In this case, after the end of this first counting time interval, three further interruptions or changes may occur in quick succession. These would not be counted in this first counting time interval that was started with the first interruption or first change. The checking of this first counting time interval would then show that no recurrent interruption or recurrent change was detected.

The second counting time interval, which begins with the second interruption or the second change, would most certainly comprise the last three interruptions or changes of the first counting time interval and also said three interruptions or changes that occurred shortly thereafter. In this second counting time interval, six interruptions or changes would then occur, and a recurrent interruption or a recurrent change would correspondingly be detected. For this said example, it would specifically not be intended to begin the second counting time interval only when the first counting time interval has elapsed, since then only said last three interruptions or changes would be detected and, if no further interruptions or changes were to occur, a recurrent interruption would not be detected, although it should be detected.

As a second variant, it is proposed that each interruption or each change is detected and is provided with a time identification. With each interruption or change, it can then be checked whether or not too many interruptions or changes have occurred within a time period of the duration of a counting time interval. Particularly, with each interruption or each change, it can be checked into the past by the time duration of the counting time interval whether or not too many interruptions or changes have occurred.

Therefore, also in this example, and others are conceivable, it is checked for each interruption or change whether it is a recurrent interruption or change in any desired time interval. Here, a counting time interval is any time window in which the interruption or change lies. The interruption or the change may in this case lie at the beginning, at the end, in the middle or in any other position in the sliding time window, that is to say in the counting time interval. If at least in one case there is a time window of the duration of a counting time interval in which the interruption or the change is a recurrent interruption, the resumption of the feeding or the recurrent changing of the feeding is suppressed. To put it another way, for each interruption or for each change it is checked whether there is a time window in which this interruption or this change lies and in which a recurrent interruption or change has been detected, in particular whether an interruption or a change has occurred in the time window more often than the predetermined limit number.

According to further embodiments, it is consequently proposed that, for checking whether there is a recurrent interruption or a recurrent change, in particular whether an interruption or a change has occurred within the counting time interval more often than the predetermined limit number, each interruption or each change is assigned a time identification and/or each interruption or each change is assigned a dedicated counting time interval, in particular with each interruption or with each change a dedicated counting time interval is started. In this case, the counting time intervals have the same time duration and it is in this respect also conceivable that counting time intervals overlap.

Preferably, the resumption of regular feeding or the feeding is automatically suppressed if, with the elapse of the counting time interval, the generator does not perform the feeding or stably perform the feeding at the second working point, the predetermined counting time interval having a duration from the list comprising: 0 seconds to 30 seconds or 0 seconds to 5 minutes or 0 seconds to 15 minutes or 0 seconds to 60 minutes.

The counting time interval consequently has a maximum duration and, if this is reached and the generator is not yet feeding stably, the resumption or the feeding of the generator is automatically suppressed. The method consequently has an automatic shut-off.

Preferably, the predetermined limit number is in a predetermined ratio with the duration of the predetermined counting time interval, which can be predetermined by way of a ratio quotient, which is defined as the quotient of the limit number to the counting time interval.

The predetermined limit number is consequently fixed in dependence on the predetermined counting time interval, and is proportional to the duration of the counting time interval. The greater the counting time interval is, the more interruptions or changes are permissible before the suppression of the feeding takes place. If, for example, a short counting time interval is determined for a weaker grid connection point, it is also the case that a small number of interruptions are permissible before the resumption is suppressed. The predetermined limit number is consequently determined by way of a ratio quotient.

Preferably, the ratio quotient of the predetermined limit number to the predetermined counting time interval is less than 0.5 Hz, in particular less than 0.1 Hz, preferably less than 0.05 Hz, the predetermined counting time interval being less than 10 seconds. Preferably, the predetermined limit number is at least 3 and at most 7.

The predetermined counting time interval consequently has a duration of at least 10 seconds and/or the predetermined limit number is at least 3 and at most 7. Moreover, the ratio quotient is at least chosen such that it is less than 0.5 Hz.

Preferably, the predetermined counting time interval is 30 seconds, with a predetermined limit number of 3, or the predetermined counting time interval is 120 seconds, with a predetermined limit number of 6. This then corresponds to a ratio quotient of 0.1 and 0.05 Hz, respectively.

Preferably, the suppressing takes place in dependence on at least one disruption from the list comprising: a loss of stability at the grid connection point and/or in the supply grid, an overcurrent at the grid connection point and/or in the supply grid, a drop to a lower voltage level at the grid connection point and/or in the supply grid, an overvoltage at the grid connection point and/or in the supply grid, an overfrequency or underfrequency in the supply grid, an oscillation of the electrical generator and/or of the supply grid, a short-circuit at the grid connection point and/or in the supply grid, an indication and/or existence of a fault of the electrical generator, and extreme gusts of wind.

Consequently, only a few physical phenomena or states of the electrical supply grid trigger a disruption or are indicated as such.

Preferably, the indication and/or existence of a fault of the electrical generator is established by a recurrent changeover of the operating modes within the predetermined counting time interval.

If the wind power installation recurrently changes over or changes the operating modes of its own accord within the counting time interval, this indicates a fault of the generator, which in turn indicates a disruption. For example, the wind power installation changes over or changes from partial-load operation to rated load operation and back again within the predetermined counting time interval of 30 seconds. This then leads to a disruption being indicated.

Preferably, the generator of electrical energy that is connected to the grid connection point of the electrical supply grid is a wind power installation or a wind farm having a number of wind power installations. As decentralized generators, wind power installations, and particularly wind farms, can also contribute to supporting the grid. It is prevented by the proposed solution that, in a special situation in which the grid is at risk of oscillating, it can prevent this oscillation.

Preferably, the resumption of regular feeding of the electrical reactive power and/or electrical active power into the electrical supply grid takes place in such a way that the reactive power is increased with a time-based reactive-power ramp function and also or alternatively the active power is increased with a time-based active-power ramp function. The reactive power or active power is consequently ramped up in a gradual and defined manner, in order to avoid a jump in reactive power or a jump in active power.

Preferably, the time-based reactive-power ramp function has a reactive-power ramp slope and also or alternatively the time-based active-power ramp function has an active-power ramp slope, while a smaller reactive-power ramp slope and also or alternatively a smaller active-power ramp slope are chosen for at least one recurrent resumption of the feeding within the counting time interval if the resumption has not yet been suppressed.

If there is a recurrent resumption of the feeding, this takes place with a slower increase of the reactive power or active power, in order in this way to avoid triggering of a renewed disruption. Preferably, with the first recurrent resumption during the counting time interval, that is to say with the second resumption within a counting time interval, the increase of the ramp is reduced. The counting time interval is consequently also used to choose in each case the reactive-power ramp slope and also or alternatively the reactive-power ramp slope.

Preferably, the reactive-power ramp slope and also or alternatively the active-power ramp slope is reduced with each further resumption of the regular feeding within the counting time interval, in particular at least by a factor of between 0.45 and 0.95.

The ramp slope of the active and/or reactive power is consequently successively reduced with each recurrent resumption of the regular feeding, in particular until the second working point is stably reached or a further resumption is suppressed. The first resumption takes place for example with a first increase of the power in relation to time. The second resumption then takes place with a second increase of the power in relation to time, this being for example only 95 percent of the first increase. The first increase is then for example 95 percent of the second increase, and so on.

Also proposed is a wind power installation, which comprises a wind-power-installation control unit that is designed to carry out a method according to an embodiment described above.

Also proposed is a wind farm, which comprises a wind-farm control unit that is designed to carry out a method according to an embodiment described above or at least has a wind power installation described above or below.

BRIEF DESCRIPTION OF THE SEVERAL VIEWS OF THE DRAWINGS

The present invention is now explained in more detail below by way of example on the basis of exemplary embodiments with reference to the accompanying figures.

DETAILED DESCRIPTION

In the following text, identical designations may be provided for elements that are similar but not identical, or they may also be provided for elements that are only represented schematically or symbolically and may differ in details, which however are not relevant for the respective explanation.

Figure 1:
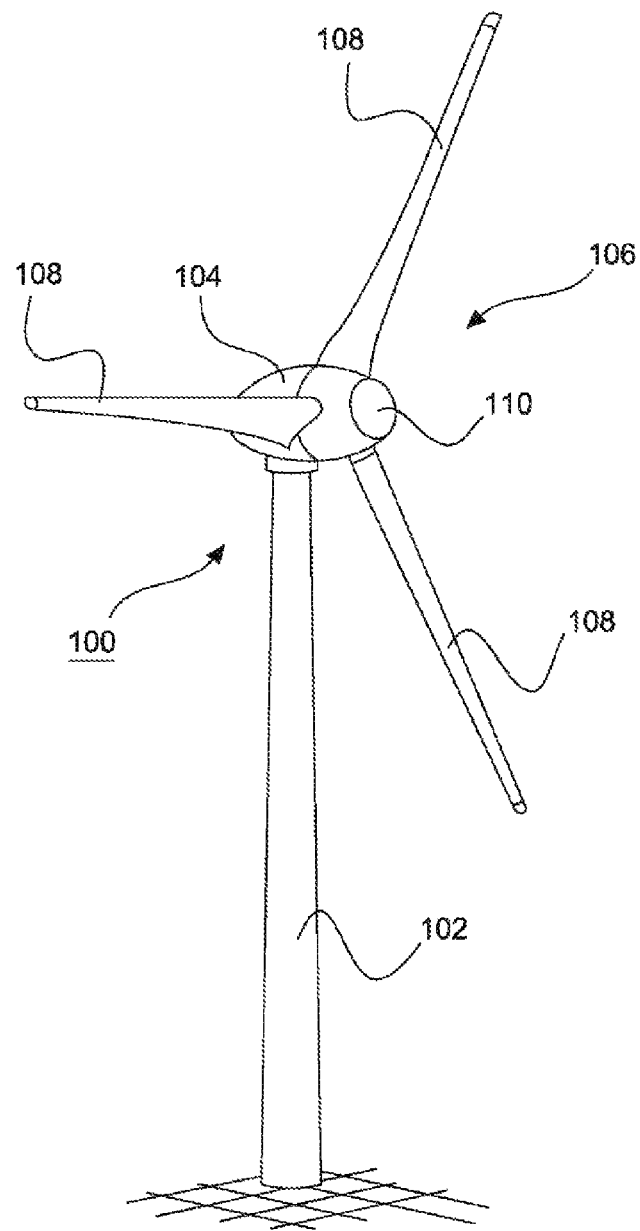
FIG. 1 schematically shows a perspective view of a wind power installation.

FIG. 1 shows a wind power installation 100 for generating electrical energy, with a tower 102 and a nacelle 104. Arranged on the nacelle 104 is a rotor 106 with three rotor blades 108 and a spinner 110. During operation, the rotor 106 is set in a rotational motion by the wind and thereby drives a generator in the nacelle 104.

Figure 2:
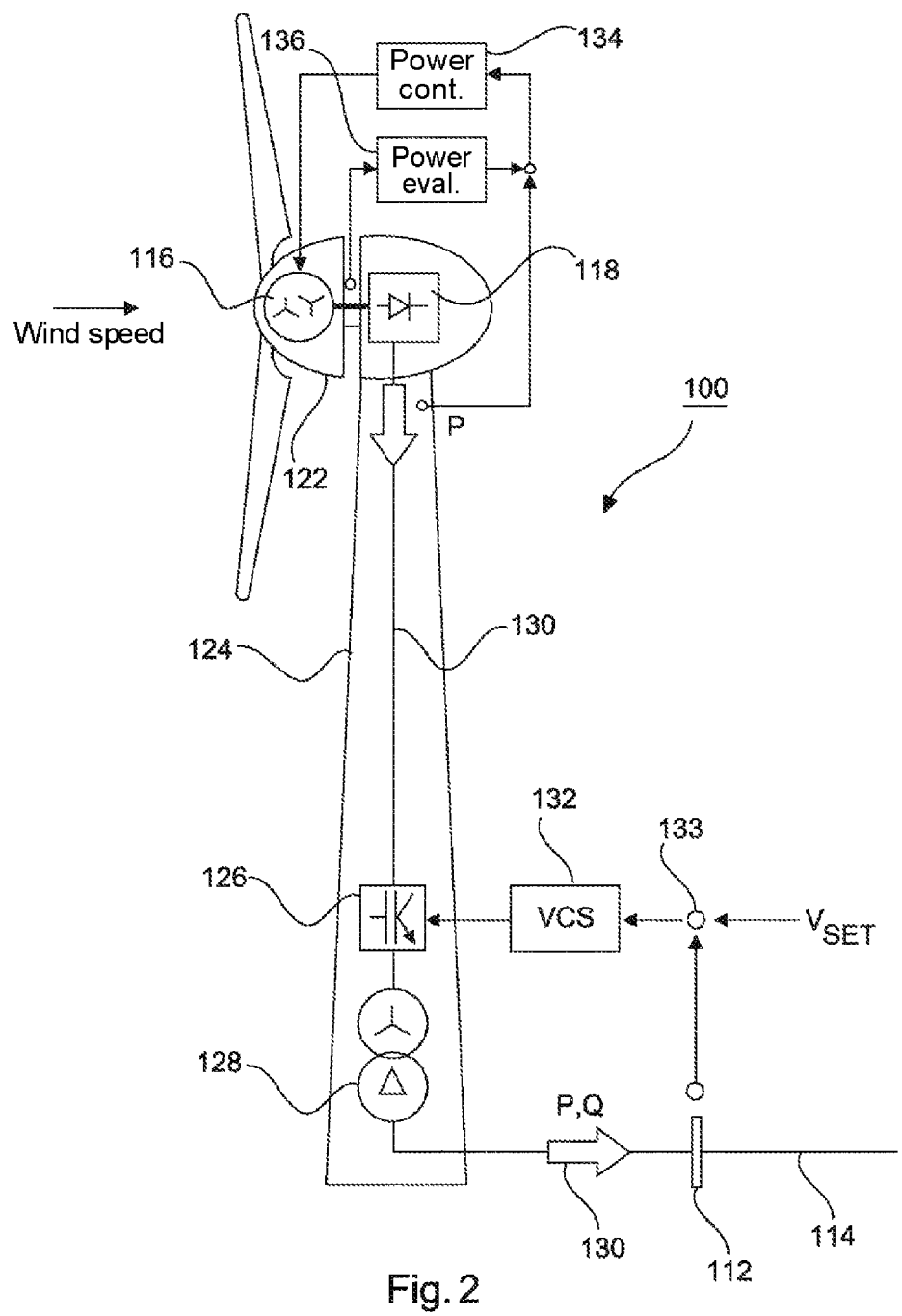
FIG. 2 schematically shows a wind power installation connected to a grid.

FIG. 2 schematically shows a wind power installation 100, which is connected by way of a grid connection point 112 to an electrical supply grid 114. For simplicity, the electrical supply grid 114 is also referred to hereinafter as the grid 114, while these terms can be regarded as synonymous.

The wind power installation 100 has a generator 116, which is operated by the wind and thereby generates electrical energy. In one embodiment, the generator 116 is designed as an electrically excited multi-phase synchronous generator 116 with two 3-phase systems respectively connected in a star-shaped manner, which is illustrated by the two star symbols in the generator 116 of FIG. 2. The alternating current thus generated, to be specific in said example 6-phase alternating current, is rectified with a rectifier 118 and transferred as direct current by way of a corresponding direct current line 120, which may comprise a number of individual lines, from the nacelle 122 down the tower 124 to an inverter 126, which may be made up of various individual inverters. The inverter 126 generates from the direct current an alternating current, to be specific in the example shown a 3-phase alternating current for feeding into the grid 114. For this purpose, the alternating voltage generated by the inverter 126 is stepped up again by means of a transformer 128, in order then to be fed into the grid 114 at the grid connection point 112. The transformer 128 shown uses a star-delta connection, to be specific on the primary side a star connection and on the secondary side a delta connection, which is only shown here as an example of an embodiment. The feeding into the grid 114 may include not only the feeding of active power P but also the feeding of reactive power Q, which is illustrated by the action arrow 130. For the actual feeding, the inverter 126 is activated by a corresponding control unit 132, while the control unit 132 can also be structurally combined with the inverter 126. FIG. 2 is intended to illustrate the basic active construction, and the actual arrangement of individual elements may also be chosen differently than that represented. For example, the transformer 128 may be provided outside the tower 124.

The control unit 132 activates the inverter 126 in particular in such a way that the manner of feeding into the grid 114 is controlled. This involves performing tasks such as adapting the current that is to be fed in to the situation in the grid 114, in particular to the frequency, phase and amplitude of the voltage in the grid 114. Furthermore, the control unit 132 is intended to control the proportion of active power P and reactive power Q of the power that is fed into the grid 114 at the particular time. Furthermore, the control unit 132 is designed to carry out a method described above or below, in particular to suppress a resumption of the feeding. For this, measurements are performed in the grid 114, in particular at the grid connection point 112, and are correspondingly evaluated, in particular to detect a disruption in the grid 114. Furthermore, the voltage at the time in the grid 114 is measured, in particular in the form of the root-mean-square value of the voltage at the time, and is compared with a preset value for the voltage, to be specific the preset value VSET.

Correspondingly, the system shown, and in particular the inverter 126 with the control unit 132, represents a voltage control system, which is also referred to by the abbreviation VCS.

For controlling the generator of the wind power installation, a power control block 134 and a power evaluation block 136 are provided in the region of the nacelle. The power control block 134 controls in particular the excitation, to be specific the excitation current, of the separately excited synchronous generator in the example of the embodiment shown. The power evaluation block 136 evaluates the power fed to the rectifier 118 and compares it with the power delivered by the rectifier 118 to the inverter 126 by way of the direct-current lines 130. The result of this evaluation is passed on to the power control block 134.

FIG. 2 also illustrates that, for correspondingly intelligent feeding, the system shown is provided with a voltage control system, in order to operate the wind power installation as stably as possible for feeding, in particular when resuming feeding.

Figure 3:
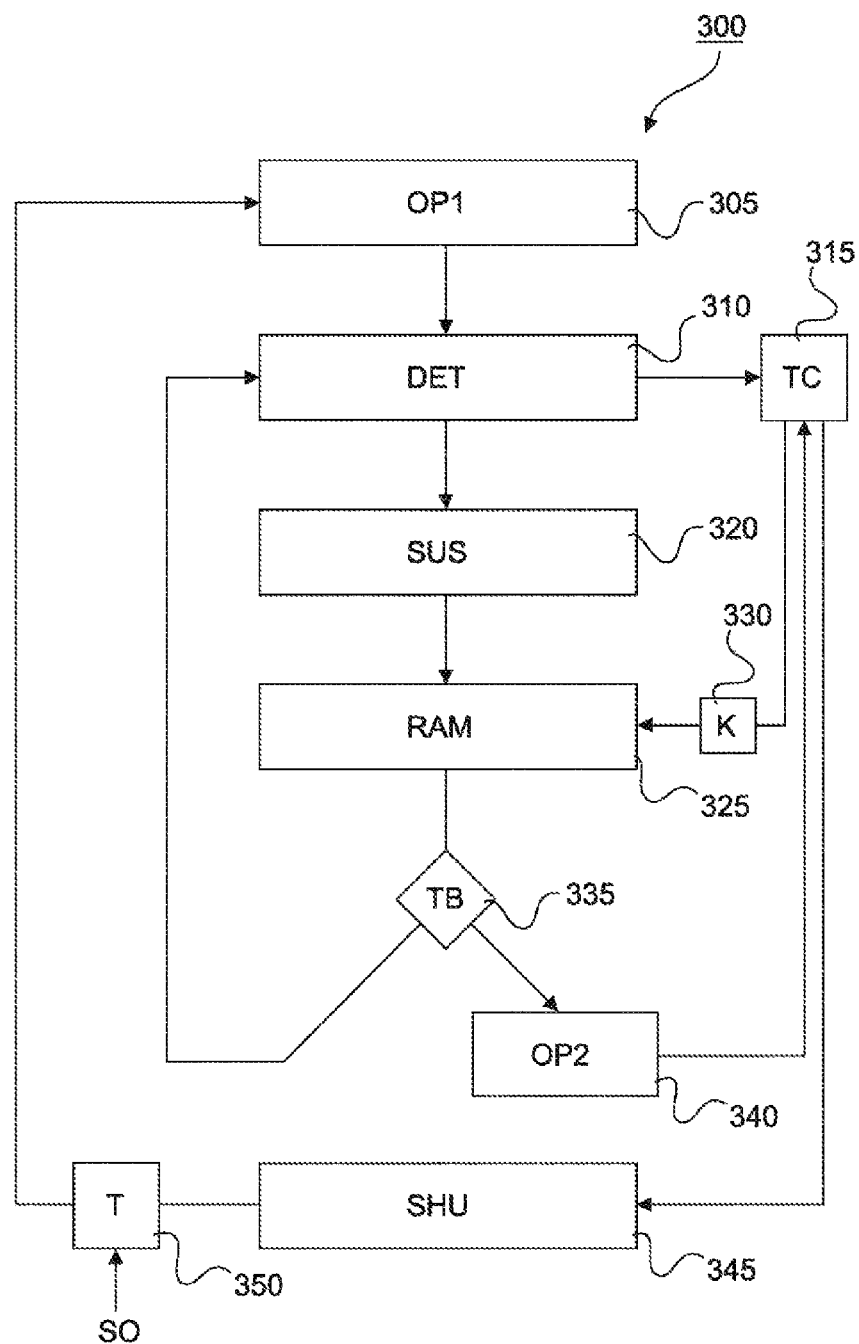
FIG. 3 schematically shows a method sequence of the method according to the invention and FIG. 4 schematically shows a profile of the power of a generator fed in by means of the method according to the invention.

FIG. 3 shows a schematic method sequence 300 of the method for controlling a generator of electrical energy connected to a grid connection point of an electrical supply grid.

In a first step, the generator feeds electrical reactive power and electrical active power into the connected supply grid. This is represented by the OP1 block 305.

If there is a disruption in the electrical supply grid or a disruption of the feeding into the electrical supply grid, this is detected and indicated in a next step. This is represented by the DET block 310. The first occurrence of a disruption is sensed and passed to the TC control block 315. The TC control block 315 then initiates the counting time interval and sets an integrated disruption counter to "1".

The feeding of the electrical reactive power and/or the electrical active power into the electrical supply grid is consequently interrupted for the first time and wind power installation is brought into the self-sustaining mode. This is represented by the SUS block 320.

In a next step, the generator of electrical energy resumes feeding the electrical reactive power and/or the electrical active power by means of a first ramp function. This is represented by the RAM block 325. The generator is then brought to a second operating point, the second working point having a higher control reserve than the first working point. This operation requires a certain time, which is represented by the TB option block 335.

If the generator stably reaches the second working point, which is represented by the, OP2 block, the predetermined counting time interval and the disruption counter of the TC control block 315 are reset. The generator is then at a stable working point and continues to be operated normally.

If the generator does not stably reach the second working point, that is to say that a renewed disruption occurs, this is once again detected in the DET block 310 and the integrated disruption counter of the TC control block 315 is set to "2". The TC control block immediately compares the disruption counter with a predetermined limit value. If the predetermined limit value is not exceeded, the loop begins from the start. The generator consequently interrupts the feeding and is brought into the self-sustaining mode. Furthermore, the TC control block 315 provides the ramp function with a correction factor K, so that, when there is recurrent resumption of the feeding, the ramp has a reduced rise. This is represented by the K block 330.

If in the comparison the disruption counter exceeds the predetermined limit value, the resumption is suppressed. This is represented by the SHU block 345. The generator is brought into a self-sustaining mode, in which it does not feed any electrical power into the supply grid. The generator stays there for a certain time, as the duration of a time band. This is represented by the T block 350.

In order to bring the generator out of this self-sustaining mode into a normal operating state, either the time band can be allowed to elapse or the generator is re-started by means of a control signal SO from the grid operator.

The implementation of the method can therefore be achieved entirely in principle with a control unit that is designed to sense a disruption and also has an event or disruption counter.

Figure 4:
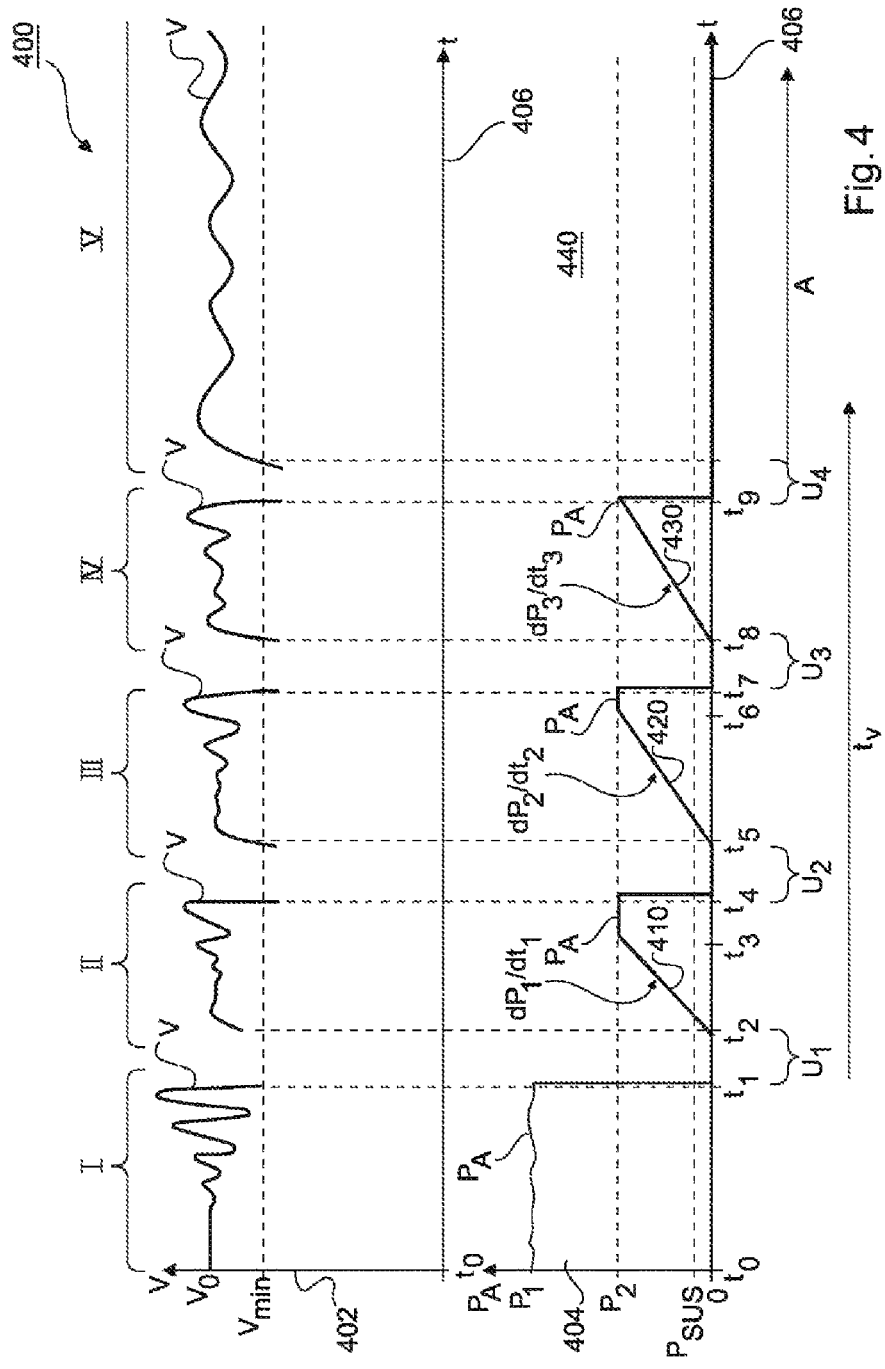

FIG. 4 shows a schematic profile 400 of an active power of the generator fed in by means of the proposed method in a diagram. For better understanding, the diagram is divided into the five vertical portions I, II, III, IV and V.

In the upper part of the diagram, the grid voltage V is plotted on the y axis 402 against time t on the x axis 406. In the lower part of the diagram, the feed-in active power $P_A$ is plotted on the y axis 404 against time t on the x axis 406. The electrical supply grid also has a rated voltage $V_0$ and the generator has an output power $P_1$.

In portion I, the schematic profile of the grid voltage V is depicted, the grid voltage oscillating and going below a lower limit value $V_{min}$. The grid consequently leaves its safe grid state and has at the point in time $t_1$ a disruption. As a result of the existence of this disruption, the generator, which is feeding the electrical reactive power $P_1$ into the electrical supply grid at a first working point, interrupts the feeding of the active power at the point in time $t_1$ and also goes over into the self-sustaining mode $P_{sus}$. The power $P_{sus}$ generated in the self-sustaining mode is not fed into the supply grid, but is used for supplying electrical power to safety components, such as omnidirectional lighting.

With the interruption $U_1$ of the feeding of the active power, the predetermined counting time interval $t_v$ is initiated and the disturbance counter is set to "1".

In portion II, the generator resumes the feeding of the active power at the point in time t2 by means of a first ramp 410, in order to arrive stably at the second working point $P_2$. For this, the ramp 410 has a first ramp rise dP1/dt1. In a short time, the generator reaches the second working point $P_2$ at the point in time $t_3$ in an unstable state. At the point in time $t_4$, the grid voltage V falls once again below the limit value $V_{min}$, and the generator once again interrupts the feeding of the active power at the point in time $t_4$.

With the interruption $U_2$ of the feeding of the active power, the disturbance counter is set to "2".

In portion III, the generator once again resumes the feeding of the active power at the point in time $t_5$ by means of a second ramp 420, in order to arrive stably at the second working point $P_2$. For this, the ramp 420 has a second ramp rise dP2/dt2, this being smaller than the first ramp rise dP1/dt1. After a short time, the generator reaches the second working point $P_2$ at the point in time $t_6$ in an unstable state. At the point in time $t_7$, the grid voltage V falls below the limit value $V_{min}$ and the generator once again interrupts the feeding of the active power at the point in time $t_7$.

With the interruption $U_3$ of the feeding of the active power, the disruption counter is set to "3".

In portion IV, the generator once again resumes the feeding of the active power at the point in time $t_8$ by means of a third ramp 430 in order to arrive stably at the second working point $P_2$. For this, the ramp 430 has a third ramp rise dP2/dt2, this being smaller than the second ramp rise dP2/dt2. The generator does not reach the working point $P_2$ and at the point in time $t_9$ interrupts the feeding, since the grid voltage V once again falls below the limit value $V_{min}$.

With the interruption $U_4$ of the feeding of the active power, the disruption counter is set to "4". The number of interruptions consequently exceeds the predetermined limit value, here 3, within the predetermined time band $t_v$ and the resumption of the feeding is suppressed. This is represented in portion V by the region 440. The generator then stays in this state for the time A until the grid operator gives the generator clearance again by means of an external signal. The feeding consequently also remains suppressed, even if the supply grid has a safe grid state.

The invention claimed is:

1. A method for controlling a generator of electrical energy connected to a grid connection point of an electrical supply grid, comprising the steps of:
   regularly feeding electrical reactive power and electrical active power into the electrical supply grid, the generator being operated at a first working point, at which the generator generates the electrical reactive power and the electrical active power,
   interrupting or changing the feeding of at least one of: the electrical reactive power or the electrical active power into the electrical supply grid in response to an indication of a disruption in the electrical supply grid or a disruption of the feeding into the electrical supply grid, and
   resuming the regular feeding of the at least one of: the electrical reactive power or the electrical active power into the electrical supply grid, the generator performing the resumption at a second working point or being ramped up to the second working point, at which the generator generates and feeds in the at least one of: the electrical reactive power or the electrical active power, and after the resumption either:
   ceasing the resumption of the regular feeding of the at least one of: the electrical reactive power or the electrical active power into the electrical supply grid in such a way that the generator ceases feeding the at least one of: the electrical reactive power or the electrical active power for a shut-off period in response to an interruption occurring within a predetermined counting time interval, wherein the shut-off period immediately follows the interruption occurring within the predetermined counting time interval, or
   ceasing the feeding of the at least one of: the electrical reactive power or the electrical active power into the electrical supply grid in such a way that the generator ceases feeding the at least one of: the electrical reactive power or the electrical active power for the shut-off period in response to a change of the feed reoccurring within the predetermined counting time interval, wherein the shut-off period immediately follows the reoccurrence of the change of the feed,
   wherein resuming the regular feeding of the at least one of: the electrical reactive power or the electrical active power into the electrical supply grid includes at least one of: increasing the electrical reactive power with a time-based reactive-power ramp function or increasing the electrical active power with a time-based active-power ramp function, and
   wherein the time-based reactive-power ramp function has a reactive-power ramp slope, and the time-based active-power ramp function has an active-power ramp slope, and a smaller reactive-power ramp slope and a smaller active-power ramp slope are chosen for at least one recurrent resumption of the feeding within the predetermined counting time interval if the resumption of the regular feeding has not yet been ceased.

2. The method as claimed in claim 1, comprising:
   recurrently interrupting or recurrently changing the feeding of at least one of: the electrical reactive power or the electrical active power based on the predetermined counting time interval, and wherein recurrent interrupting or recurrent changing occurs when the interrupting or changing of the feed has occurred within the predetermined counting time interval more often than a predetermined limiting number.

3. The method as claimed in claim 1, comprising:
feeding less of the at least one of: the electrical reactive power or the electrical active power at the second working point than at the first working point.

4. The method as claimed in claim 1, comprising:
starting the predetermined counting time interval with the interruption or the change of the feeding of the at least one of: the electrical reactive power or the electrical active power,
resetting the predetermined counting time interval with the ceasing of the resumption or the ceasing of the feeding of the at least one of: the electrical reactive power or the electrical active power, or if feeding is performed without interruption or without change, ending the predetermined counting time interval after reaching the second working point.

5. The method as claimed in claim 1, wherein with each interruption or with each change, the method comprises checking whether the interruption or the change is a recurrent interruption or change in the predetermined counting time interval more often than a predetermined limit number.

6. The method as claimed in claim 5, wherein for checking whether the interruption or the change is a recurrent interruption or a recurrent change, each interruption or each change is assigned at least one of: a time identification or a dedicated counting time interval.

7. The method as claimed in claim 5, wherein the predetermined limit number is in a predetermined ratio with a duration of the predetermined counting time interval, which is predetermined by way of a ratio quotient, wherein the ratio quotient is defined as a quotient of the predetermined limit number to the predetermined counting time interval.

8. The method as claimed in claim 7, wherein at least one of:
the ratio quotient of the predetermined limit number to the predetermined counting time interval is less than 0.5 Hz, the predetermined counting time interval being less than 10 seconds; or
the ratio quotient of the predetermined limit number to the predetermined counting time interval is less than 0.5 Hz, the predetermined counting time interval being at most 5.

9. The method as claimed in claim 5, wherein the checking includes checking whether the interruption or the change has occurred in the predetermined counting time interval more often than the predetermined limit number.

10. The method as claimed in claim 1, wherein resuming the regular feeding or the regularly feeding is automatically ceased if, with the elapse of the predetermined counting time interval, the generator does not perform the feeding or stably perform the feeding at the second working point, the predetermined counting time interval having a duration of:
0 seconds to 30 seconds,
0 seconds to 5 minutes,
0 seconds to 15 minutes, or
0 seconds to 60 minutes.

11. The method as claimed in claim 1, wherein the ceasing takes place in dependence on at least one disruption from a list comprising:
a loss of stability at the grid connection point,
a loss of stability in the electrical supply grid,
an overcurrent at the grid connection point,
an overcurrent in the electrical supply grid,
a drop to a lower voltage level at the grid connection point,
a drop to a lower voltage level in the electrical supply grid,
an overvoltage at the grid connection point,
an overvoltage in the electrical supply grid,
an overfrequency or underfrequency in the electrical supply grid,
an oscillation of the generator,
an oscillation of the generator of the electrical supply grid,
a short-circuit at the grid connection point,
a short-circuit in the electrical supply grid,
an indication of a fault of the generator,
an existence of a fault of the generator, and
extreme gusts of wind.

12. The method as claimed in claim 11, wherein the indication of the fault of the generator and the existence of the fault of the generator are established by a recurrent changeover of operating modes within the predetermined counting time interval.

13. The method as claimed in claim 1, wherein the generator is in a wind power installation or a wind farm having a plurality of wind power installations.

14. The method as claimed in claim 1, wherein at least one of: the reactive-power ramp slope or the active-power ramp slope is reduced with each further resumption of the regular feeding within the predetermined counting time interval.

15. The method as claimed in claim 14, wherein at least one of: the reactive-power ramp slope or the active-power ramp slope is reduced by a factor between 0.45 and 0.95.

16. A wind power installation comprising a control unit that is configured to carry out the method as claimed in claim 1.

17. A wind farm comprising a controller to carry out the method as claimed in claim 1.

* * * * *